April 29, 1952  J. A. HARDY  2,594,555
VIBRATION DAMPER
Filed March 18, 1949  2 SHEETS—SHEET 2
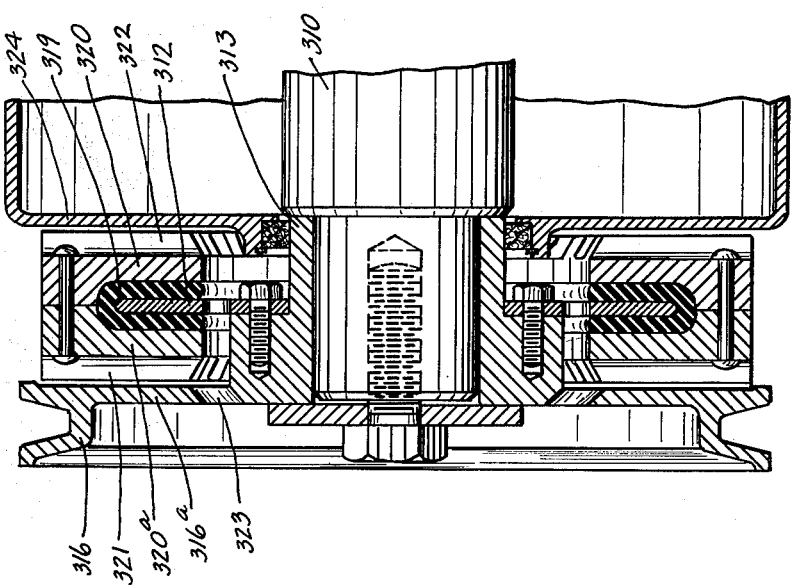
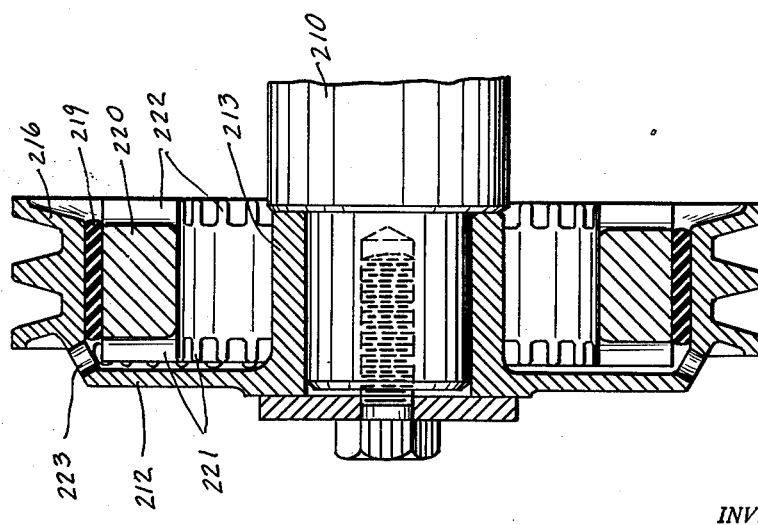
INVENTOR.
JAMES A. HARDY.
BY
Lockwood, Goldsmith & Galt
ATTORNEYS.

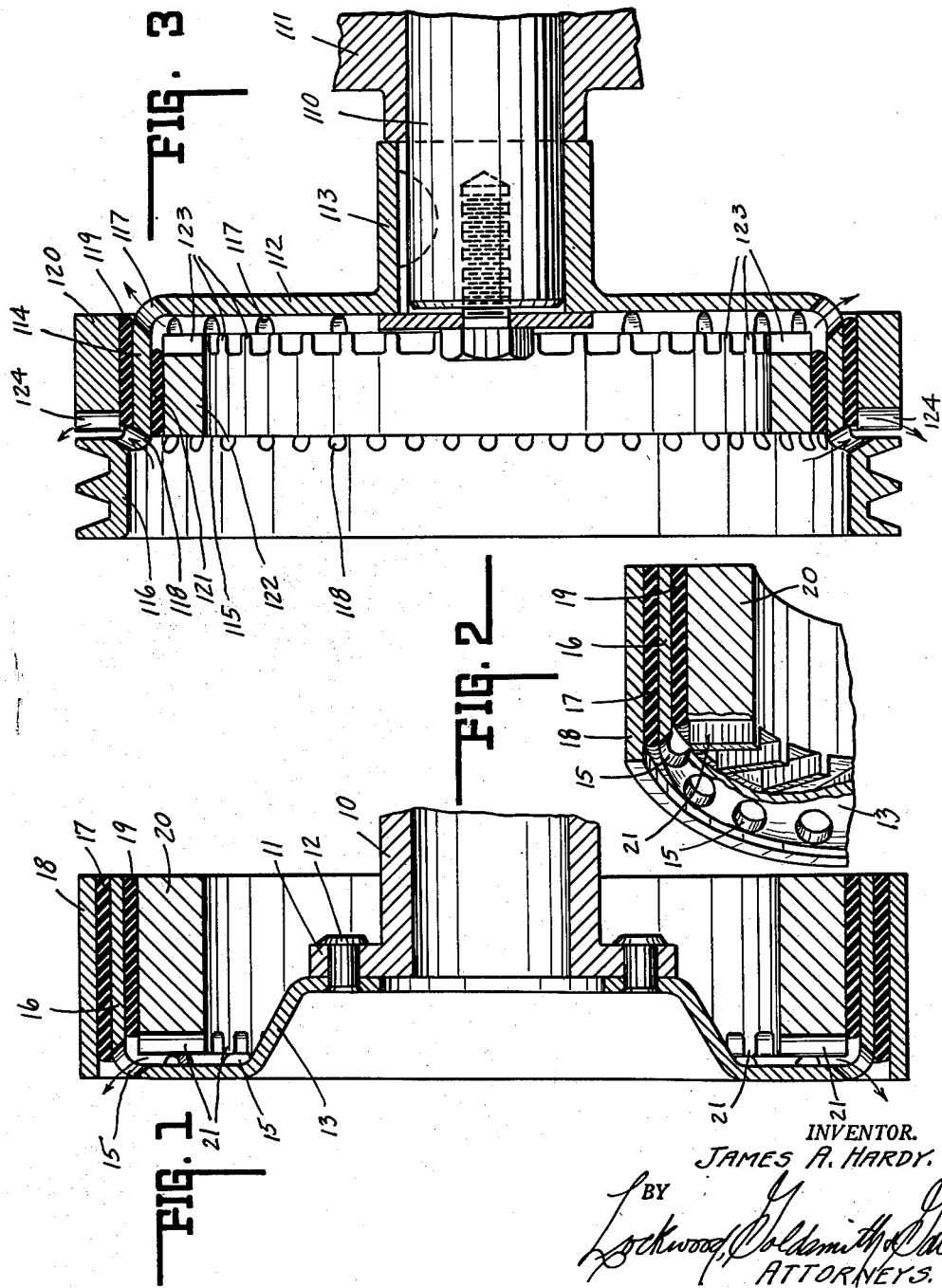

Patented Apr. 29, 1952

2,594,555

UNITED STATES PATENT OFFICE 2,594,555

VIBRATION DAMPER

James A. Hardy, Indianapolis, Ind., assignor to Schwitzer-Cummins Company, Indianapolis, Ind., a corporation Application March 18, 1949, Serial No. 82,241

4 Claims. (Cl. 74—574)

This invention relates to a vibration damper, particularly applicable for use in damping the vibration of engine crank shafts wherein an inertia element is mounted in driving relation therewith through a suitable energy converting medium, such as a rubber insert for absorbing and reducing torsional impulses.

It is the object of the invention to incorporate means for air cooling such energy converting medium, particularly when it consists of rubber or a rubber-like material, to thereby prevent its disintegration through the effect of heat generated therein. In certain installations and uses of such a damper, a high degree of heat is generated in the rubber by reason of its internal shearing action due to rapid pulsation, and particularly wherein it may be housed and associated with heat generating engines such as internal combustion engines.

It is, therefore, proposed to provide an air cooling means for withdrawing and dissipating heat from the rubber upon the damper being rotated at high speeds. This is accomplished by incorporating fins or suitable formations in the damper for generating air currents thereover and thereby withdraw heat by convection from the rubber through the air cooled metal elements in contact therewith.

The full nature of the invention will be understood from the accompanying drawings and the following description and claims:

Fig. 1 is a central vertical section through one form of vibration damper.

Fig. 2 is a sectional perspective view showing a portion thereof with parts broken away.

Fig. 3 is a central vertical section through a modified form of damper including a belt driven pulley.

Fig. 4 is a fragmentary section through a second modified form of damper.

Fig. 5 is a fragmentary section through a third modified form of damper.

In the drawings Fig. 1 is illustrative of one modification of a vibration damper having a driving sleeve 10 adapted to be suitably secured to and driven by a shaft, such as the crank shaft of an internal combustion engine. Said sleeve is provided with a flange 11 to which is secured by rivets 12 or the like, a dished driving plate 13. Adjacent the outer periphery of said plate there is provided an outer annular series of spaced air discharge ports 15. Said disk is formed adjacent the discharge ports 15 with a cylindrical flange 16. Secured about the outer periphery of said flange 16 there is provided an energy converting medium 17 herein shown in the form of a band of rubber or rubber-like material with sufficient thickness to permit of an internal shearing action. Mounted about the band 17 there is an outer inertia element 18.

Mounted about the inner periphery of the flange 16 there is a similar band of rubber 19, and mounted internally of said band 19 there is provided an internal inertia member 20. The inertia member and bands are mounted with respect to each other to prevent angular displacement therebetween such as through clamping engagement or surface bonding therebetween.

The relative dimensions of the bands and inertia elements and the relative weights of the latter are such as to obtain therethrough the desired dampening action depending upon the speed of rotation and type of mechanism with which the member is associated. However, wherein the structure is such that the inertia member and its associated energy converting medium is largely shielded from normal air cooling, difficulty results from overheating and consequent disintegration of the rubber or rubber-like material. It, therefore, becomes necessary to artificially cool this material. To that end the inner shielded inertia element 20 is formed with a series of fins 21 about one end thereof to extend toward and lie adjacent the air outlet ports 15. Said fins serve in the nature of fan blades or vanes, as in a rotary blower wheel, so that through the rapid rotation of the damper, air will be drawn over the inertia member 20 and discharged through the outlet ports 15.

By means of such structure a flow of air will be induced over and about the exposed surfaces of the inner shielded inertia member 20 to dissipate heat therefrom, which in turn will withdraw heat by convection from the inner shielded band 19. However, the normal air sweep over the external exposed inertia member 18 will effect sufficient cooling action thereof, to withdraw heat from the outer resilient band 17. Thus, it is found that in damper structures which have soon been destroyed through overheating of the rubber forming the energy converting medium, such induced air cooling action within the shielded portion of the damper will prevent destruction thereof from overheating.

In the modified form of damper, as shown in Fig. 3, the principle of the air cooling action and the result obtained, are as above described when applied to a combination damper and pulley wherein the pulley may have the effect of shielding the damper against normal external air cooling. Herein there is shown a drive or crank shaft 110 mounted in a bearing 111 on the end of which there is keyed a driving disk 112 having a hub portion 113. Said driving disk is formed with a cylindrical flange 114 having as a continuation thereof a shouldered portion 115 terminating in a cylindrical extension 116 which may serve as an engine fan pulley.

The driving disk 112 is provided with an annular series of spaced air discharge ports 117 adjacent one end of its cylindrical flange 114, and a similar annular series of spaced air discharge ports 118 adjacent the opposite end of the cylindrical flange, as within the shoulder 115 between said flange and the pulley extension 116.

Mounted about the cylindrical flange 114 there is an outer band 119 of the energy converting medium such as rubber about which there is mounted an external inertia element 120. Mounted about the inner surface of said cylindrical flange there is an inner band 121 with an inner inertia member 122 carried thereby, all as above described in respect to Figs. 1 and 2.

The inner inertia member 122 is formed with a series of peripheral vanes 123 extending toward and adjacent to the driving disk 112 for circulating cooling air over the surface of said member and discharging it through the discharge ports 117. The inertia member 120 is provided with a similar series of vanes 124 extending toward and adjacent the pulley extension 116. Said vanes are adapted to draw air through the ports 118, effecting circulation over the adjacent surface of the member 122, portions of the cylindrical flange 114, and particularly over the elements 120, for inducing extraction of heat from the bands 119 and 121. Thus, the shielding effect of the pulley mounted adjacent the inertia members will be overcome through the induced air circulation over and about said members with the resultant cooling of the interposed band of rubber energy converting medium.

In the modified form shown in Fig. 4 there is provided a damper having a single energy converting medium 219. It is interposed between the inertia element 220 and the pulley 216 carried by the driving plate 212 on the hub 213. In this modification the inertia element 220 is formed with laterally extending fins 221 and 222 extending from opposite sides thereof, respectively. Said fins induce a current of cooling air over the surface of the inertia member for heat convection in the cooling of the medium 219. Plate 212 and pulley 216 are provided with air discharge apertures 223 as above described.

In the modified form of Fig. 5 the hub 313 is provided with a radial driving plate 312 secured thereto. The inertia member is in the form of a pair of disks 320 and 320a riveted together to clamp about the plate 312, a disk 319, U-shaped in cross section, comprising the energy converting medium. The pulley 316 is provided on the periphery of the flange 316a extending from the hub 313 and provided with a plurality of discharge apertures 323. Each of the clamping disks 320 of the inertia element is formed about its outer surface with a series of radially disposed fins 321 and 322 extending in close proximity to the flange 316a and a housing structure 324.

The invention claimed is:

1. In a vibration damper including a radially extending driving plate having an annular series of spaced air ports and a cylindrical flange, an energy converting medium carried by said flange substantially coextensive therewith, an annular inertia member mounted upon said medium, said medium acting to resiliently resist angular displacement of said member relative to said flange, and a series of air displacing vanes formed on said member extending outwardly to effect a circulation of cooling air thereover for dissipating heat from the medium during operation of the damper.

2. In a vibration damper including a radially extending driving plate having a cylindrical flange and an annular series of spaced air ports adjacent said flanges, an annular band of rubber or rubber-like material mounted upon said flange in direct contact with the inner surface thereof, an annular inertia member mounted upon said band in direct contact with its inner surface, said band acting to resist angular displacement of said member relative to said flange, and a series of air displacing vanes formed on said member extending toward and adjacent said driving plate and air ports to effect a circulation of cooling air over said member for discharge through said ports to thereby dissipate heat from said band during operation of the damper.

3. In a vibration damper including a radially extending driving plate having a cylindrical flange and an annular series of spaced air ports adjacent said flange, a pulley section formed as an extension of said flange having an annular series of air ports therebetween, energy converting material carried by the inner and outer surfaces respectively of said cylindrical flange, an inner inertia member carried by the inner material, an outer inertia member carried by the outer material, said material acting to resist angular displacement of said member relative to said flange, a series of air displacing vanes formed on said inner member extending forward and adjacent said first-mentioned ports, and a series of air displacing vanes formed on said outer member extending toward and adjacent said second-mentioned ports and pulley section, said vanes acting to circulate cooling air through their respective ports for dissipating heat from said material.

4. In a vibration damper including a radially extending driving plate, a pulley section formed as an extension of said plate having an annular series of air ports therein, an energy converting medium carried by said plate, an inertia member carried by said medium, said medium acting to resist angular displacement of said member relative to said plate, a series of air displacing vanes formed on one side of said member extending adjacent said air ports, and a series of air displacing vanes formed on the opposite side of said member, said vanes acting to circulate cooling air thereover for dissipating heat from said medium.

JAMES A. HARDY.

REFERENCES CITED

The following references are of record in the file of this patent:

UNITED STATES PATENTS

| Number | Name | Date |
|---|---|---|
| 1,790,516 | Williams | Jan. 27, 1931 |
| 1,876,767 | Selden | Sept. 13, 1932 |
| 1,954,937 | Litle | Apr. 17, 1934 |
| 1,962,746 | Lee | June 12, 1934 |
| 2,198,135 | Strausburg et al. | Apr. 23, 1940 |
| 2,201,932 | Ribbetts | May 21, 1940 |